United States Patent Office 3,346,925
Patented Oct. 17, 1967

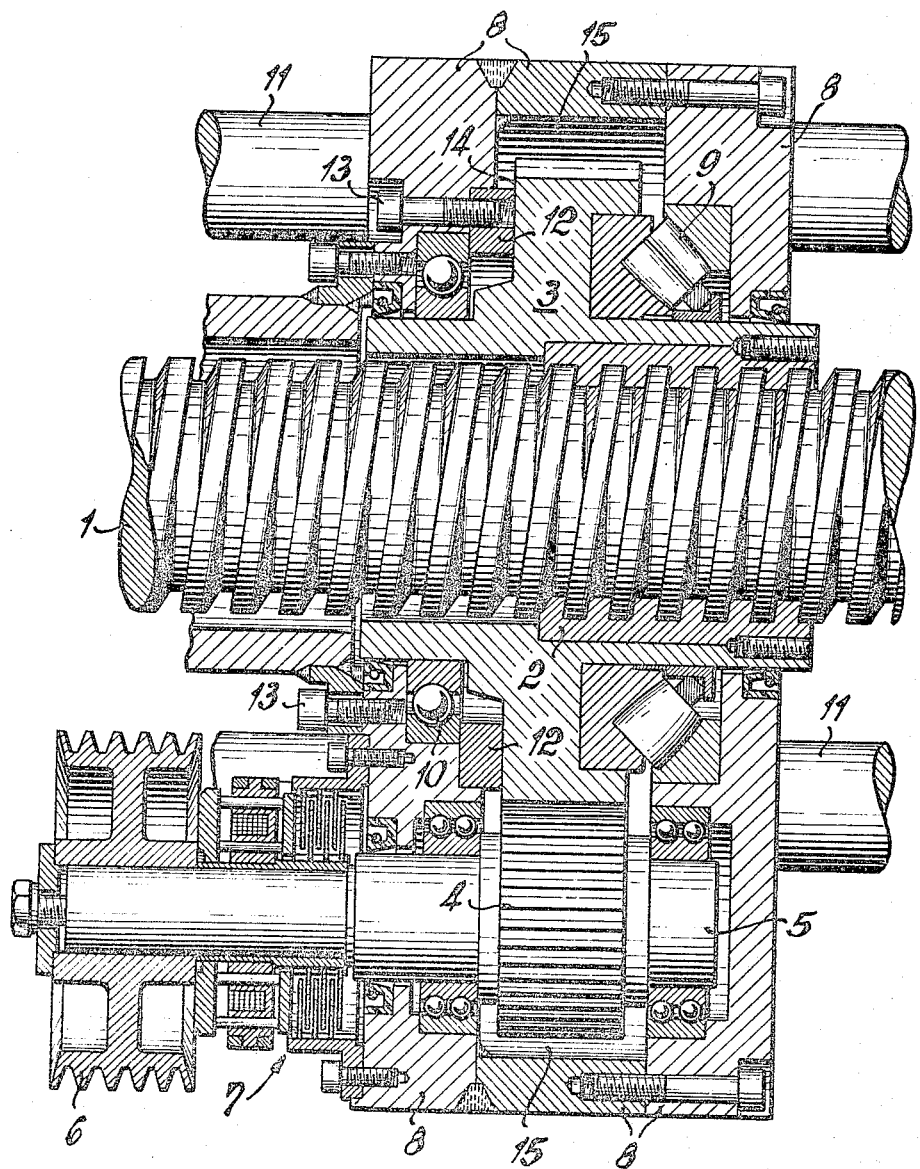

3,346,925
LOCKING DEVICES FOR MOULD CLOSING MECHANISM
Anton Maier, Kirchheim-Teck, Lindorf, Germany
Filed Sept. 8, 1965, Ser. No. 485,839
Claims priority, application Germany, Dec. 15, 1964,
M 63,498
3 Claims. (Cl. 18—30)

This invention concerns a locking device for the closing mechanism of moulding machines, e.g. injection moulding machines, wherein a closing member is axially displaceable by means of a mechanical drive through a threaded spindle and provided with a remote control instant brake device.

The object of locking devices of this kind is for example to ensure that, after the feed path in an injection moulding machine has been covered, the considerable retaining pressure is maintained. Heretofore electrical or even mechanical instant braking devices were used for such locking devices. Owing to the very high retaining pressures, these braking devices had to involve a complicated construction which led to a disproportionate increase of costs of the whole machine. Owing to the required size of the braking device, it was not possible to avoid a certain lack of safety.

These deficiencies have been minimized by the invention due to the fact that a component of the mechanical drive has a surface extending at right angles to the spindle axis, serving as support for an additional self-braking member secured in the machine, and moreover the friction surface of the additional braking member comprises a sliding material which is softer than the material of the opposite surface. By this means the instant brake is relieved particularly of the high retaining pressures, without requiring the structural complexity of the whole braking device to be substantially increased. The overall complexity in any case lies substantially below the technical complexity which is required in known instant brakes.

This braking function of the self-braking member occurs expediently at a minimum pressure of 200 kg./cm.² of the component of the drive supporting the opposite surface against the brake member.

A further simplification according to the invention is achieved by the fact that the component of the drive supporting the opposite surface is adapted as a gear wheel and simultaneously serves as carrier for a threaded nut for the threaded spindle. Owing to the fact that the vertical opposite surface is thus provided on a component of the gearing which is necessary anyhow, the technical complexity for the additional automatic brake is further reduced.

The accompanying drawing illustrates an axial section through an embodiment of the invention by way of example.

A threaded spindle 1 is a constituent member of the injection moulding machine and reciprocates a displaceable mould half carrier. A threaded nut 2 is mounted on the spindle 1. Firmly connected to the threaded nut 2 is a gearing component 3 adapted as a gear wheel. The gearing component 3 meshes with a pinion 4 which is mounted on a driving shaft 5. Mounted on the driving shaft 5 is a driving wheel 6 which is adapted to be driven in a conventional manner by means of a V-belt connected with a main drive of the machine. Also mounted on the driving shaft 5 is an instant brake 7 the purpose of which is to limit the closing and opening paths of the machine. The direction of rotation of the driving shaft 5 is reversible. The gearing component 3 is supported within a housing 8 on the opening side by a tapered roller bearing 9 and on the closing side by a radial bearing 10. The housing 8 is mounted on guide spars 11. Secured by means of screw 13 in the housing 8 is an auxiliary braking element in the form of a brake ring 12. The brake ring 12 abuts against a surface 14 of the gearing component 3 which extends at right angles to the axis of the threaded spindle 1. The material of the brake ring 12 is softer than that of the surface 14 of the gearing component 3.

The inner space 15 of the housing 8 is filled partly with oil, which with normal pressure is also present during the closing and opening path even between the brake ring 12 and the surface 14.

During these operations the surface 14 hence is in sliding engagement with the fixed brake ring 12. As soon as the pressure of the gearing component 3 against the brake ring 12 increases owing to the build-up of retaining pressure on the mould, and exceeds a certain magnitude, the oil between the surface 14 and the brake ring 12 is forced out so that the contact surfaces of the gearing component 3 and the brake ring 12 becomes dry. At this instance the additional braking function sets in counter to the retaining pressure.

I claim:
1. In a molding machine having a housing, a threaded spindle rotatably mounted in said housing, a rotatable mold-closing member mounted for axial displacement on said spindle between a first and a second position in response to rotation of said spindle, rotary drive means operative for rotating said spindle, and brake means associated with said drive means and operative for arresting rotation thereof, the improvement consisting in the provision of auxiliary brake means including a first abutment face provided on said member and extending at a right angle to the axis of said spindle facing in a given direction; and a stationary auxiliary braking element carried by said housing and having a second abutment face facing oppositely said given direction in sliding engagement with said first abutment face when said member is in said first position, at least said second abutment face being of material which is softer than the material of said first abutment face, displacement of said member from said first toward said second position resulting in engagement of said abutment faces with increasing pressure, said auxilary brake means affording auxiliary braking action upon said pressure reaching a predetermined value.

2. In a molding machine as defined in claim 1, wherein said predetermined value is a minimum abutment pressure between said abutment faces of 200 kg./cm.².

3. In a molding machine as defined in claim 1, wherein said mold closing member comprises an inner portion provided with internal threads meshing with the threads on said spindle for axial movement thereon, and an outer portion carried by said inner portion with freedom of rotation relative thereto.

References Cited

UNITED STATES PATENTS

| 2,358,686 | 9/1944 | Caron | 18—30 |
| 2,498,264 | 2/1950 | Goldhard | 18—30 |
| 3,044,389 | 7/1962 | Rexford. | |
| 3,093,863 | 6/1963 | Ehlert | 18—30 |
| 3,184,810 | 5/1965 | Hoern | 18—30 XR |
| 3,191,235 | 6/1965 | Rougement | 18—30 XR |

FOREIGN PATENTS 1,404,585  5/1965  France.

J. HOWARD FLINT, JR., *Primary Examiner.*